US009003084B2

(12) United States Patent
Stanfill et al.

(10) Patent No.: US 9,003,084 B2
(45) Date of Patent: *Apr. 7, 2015

(54) SORTING

(75) Inventors: Craig W. Stanfill, Lincoln, MA (US);
Carl Richard Feynman, Waban, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,056

(22) Filed: Feb. 18, 2011

(65) Prior Publication Data

US 2012/0215992 A1    Aug. 23, 2012

(51) Int. Cl.
*G06F 3/00* (2006.01)
*G06F 7/22* (2006.01)
*G06F 9/54* (2006.01)

(52) U.S. Cl.
CPC *G06F 7/22* (2013.01); *G06F 9/544* (2013.01); *G06F 2209/548* (2013.01); *G06F 9/546* (2013.01); *G06F 2207/226* (2013.01)

(58) Field of Classification Search
CPC .... G06F 9/544; G06F 2209/548; G06F 9/546
USPC ................................... 710/29, 33, 56, 57, 52
See application file for complete search history.

(56) References Cited

U.S. PATENT DOCUMENTS

| 5,410,672 | A | 4/1995 | Sodek, Jr. et al. | |
|---|---|---|---|---|
| 5,867,663 | A | 2/1999 | McClure et al. | |
| 5,966,072 | A | 10/1999 | Stanfill et al. | |
| 5,996,031 | A * | 11/1999 | Lim et al. | 710/52 |
| 6,088,716 | A | 7/2000 | Stanfill et al. | |
| 6,161,155 | A * | 12/2000 | Simms et al. | 710/57 |
| 6,401,147 | B1 | 6/2002 | Sang et al. | |
| 6,842,800 | B2 * | 1/2005 | Dupont | 710/52 |
| 6,925,539 | B2 | 8/2005 | Mowery et al. | |
| 7,003,597 | B2 * | 2/2006 | Georgiou et al. | 710/56 |
| 7,164,422 | B1 | 1/2007 | Wholey, III et al. | |
| 7,213,087 | B1 | 5/2007 | Bertone et al. | |
| 8,332,555 | B2 | 12/2012 | Sutardja | |
| 8,447,901 | B2 | 5/2013 | Stanfill et al. | |
| 2002/0149788 | A1 | 10/2002 | Nishikata et al. | |
| 2003/0126336 | A1 | 7/2003 | Creta et al. | |
| 2006/0120405 | A1 * | 6/2006 | Engbersen | 370/473 |
| 2007/0168583 | A1 * | 7/2007 | Kim | 710/56 |
| 2008/0104313 | A1 * | 5/2008 | Chu | 711/104 |

(Continued)

FOREIGN PATENT DOCUMENTS

| CA | 2271669 | 5/2000 |
|---|---|---|
| JP | 11175281 | 7/1999 |

OTHER PUBLICATIONS

Managing Buffer Conditions, 19 pages.

(Continued)

*Primary Examiner* — Ernest Unelus
(74) *Attorney, Agent, or Firm* — Fish & Richardson P.C.

(57) ABSTRACT

Systems and techniques are disclosed that include in one aspect a computer implemented method storing a received stream of data elements in a buffer, applying a boundary condition to the data elements stored in the buffer after receiving each individual data element of the stream of data elements, and producing one or more data elements from the buffer based on the boundary condition as an output stream of data elements sorted according to a predetermined order.

84 Claims, 4 Drawing Sheets

(56) References Cited

U.S. PATENT DOCUMENTS

| | | | |
|---|---|---|---|
| 2008/0301336 A1* | 12/2008 | Bilak et al. | 710/56 |
| 2009/0125666 A1* | 5/2009 | Freking et al. | 710/316 |
| 2009/0327372 A1* | 12/2009 | Ylonen | 707/206 |
| 2010/0153593 A1* | 6/2010 | Allen et al. | 710/39 |
| 2011/0238872 A1 | 9/2011 | Sutardja | |
| 2012/0215997 A1 | 8/2012 | Stanfill et al. | |

OTHER PUBLICATIONS

Pugh, William (Jun. 1990), "Skip lists: a probabilistic alternative to balanced trees", Communications of the ACM 33 (6):668-676.

Aragon, Cecilia, et al., "Randomized Search Trees," Annual Symposium on Foundations of Computer Science, Research Triangle Park, Oct. 30-Nov. 1, 1989, 6 pages.

Eddy, C., "Inline Buffered Sort," VelocityReviews.com, Apr. 18, 2005, http://www.velocityreviews.com/forums/ t142842-inline-buffered-sort.html, 3 pages.

International Search Report & Written Opinion, PCT/US2012/025375, mailed Oct. 16, 2012, 11 pages.

Lotan, Itay, "Skiplist-Based Concurrent Priority Queues," Proceedings of the 14$^{th}$ International Parallel and Distributed Processing Symposium, May 1, 2000, 23 pages.

Xu, Haifeng, et al., "Client Architecture for MPEG-4 Streaming," Digital Media on Demand, IEEE Computer Society, 2004, 8 pages.

International Search Report & Written Opinion, PCT/US/2012/025441, mailed Jun. 8, 2012, 5 pages.

Liebeherr, Jörg, et al., "Priority Queue Schedulers with Approximate Sorting in Output-Buffered Switches." IEEE Journal on Selected Areas in Communications, vol. 17, No. 6, Jun. 1999, pp. 1127-1144.

Morris, John, "8.3 Hash Tables." Data Structures and Algorithms, 1998, 4 pages.

Seidel, R. et al., "Randomized Search Trees." Algorithmica (1996) 16: 464-497.

Transaction History, U.S. Appl. No. 13/031,034, Jul. 3, 2013, 3 pages.

Transaction History, U.S. Appl. No. 13/799,249, Jul. 3, 2013, 1 page.

\* cited by examiner 7 11 21 8 15 7 5 3
| 0 |

W = 15; S = 0     Output = NIL     ⎯202

7 11 21 8 15 7 5
| 3,0 |

W = 15; S = 0     Output = NIL     ⎯204

7 11 21 8 15 7
| 5,3,0 |

W = 15; S = 0     Output = NIL     ⎯206

7 11 21 8 15
| 7,5,3,0 |

W = 15; S = 0     Output = NIL     ⎯208

7 11 21 8
| 15,7,5,3 |

W = 15; S = 3     Output = 0     ⎯210

7 11 21
| 15,8,7,5,3 |

W = 15; S = 3     Output = 0     ⎯212

7 11
| 21,15,8 |

W = 15; S = 8     Output = 3,5,7     ⎯214

7
| 21,15,11,8 |

W = 15; S = 8     Output = NIL     ⎯216

| 21,15,11,8,7 |

W = 15; S = 7     Output = NIL     ⎯218

FIG. 2

SORTING

BACKGROUND

This disclosure relates to sorting.

Similar to various data processing techniques, sorting techniques may play an important role in many applications. For example, data trends and dissimilarities may be quickly identified by a viewer upon being presented a sorted data list (based upon one or more sorting parameters). By sorting a list into, e.g., ascending or descending order, data boundaries, ranges and other quantities can be visually discernable. The efficiency of a sort algorithm may be evaluated through many methodologies, such as by a function of the number of data element comparisons executed and data element movements necessary to produce a sorted list.

SUMMARY

In one aspect, in general, a computer implemented method includes storing a received stream of data elements in a buffer, applying a boundary condition to the data elements stored in the buffer after receiving each individual data element of the stream of data elements, and producing one or more data elements from the buffer based on the boundary condition as an output stream of data elements sorted according to a predetermined order.

Aspects can include one or more of the following.

Producing the one or more data elements from the buffer can include producing at least a smallest data element from the buffer. Producing the one or more data elements from the buffer can include producing at least a largest data element from the buffer. Each received data can represent a data record production time. The output stream of data elements can be sorted according to reverse chronological order. The data elements of the received stream of data elements can be partially sorted. The data elements of the received stream of data elements can arrive substantially asynchronously at the buffer. Storing a received stream of data elements in a buffer can include inserting each individual element of the received stream of data elements in the buffer at a location determined by the sort order of the buffer.

Applying a boundary condition to the data elements stored in the buffer can include identifying a smallest data element from the data elements stored in the buffer, and determining whether a difference between the smallest data element and the received individual data element exceeds a threshold value. Producing one or more data elements from the buffer based on the boundary condition can include producing the one or more data elements from the buffer if the one or more data elements exceed the threshold value. Applying a boundary condition to the data elements stored in the buffer can include determining whether a maximum size of the buffer is exceeded. Producing one or more data elements from the buffer based on the boundary condition can include producing the one or more data elements from the buffer if the maximum size of the buffer is exceeded.

Applying a boundary condition to the data elements stored in the buffer can include determining whether a newly received data element exceeds a cutoff value. The method can further include buffering the newly received data element if the element does not exceed the cutoff value. Producing one or more data elements from the buffer based on the boundary condition can include producing the newly received data element as the one or more data elements produced from the buffer if the newly received data element does not exceed the threshold value. The buffer can be implemented by a skip list data structure. The buffer can be implemented by a treap data structure. One or more of the individual data elements in the received stream of data elements can be derived from data records that are input to a component in a graph-based computation system.

In another aspect, in general, a computer implemented method can include applying a boundary condition to received data elements after receiving each individual data element of a stream of data elements, storing one or more data elements of the stream of data elements based on a first result of the boundary condition, and producing one or more data elements as an output stream of data elements sorted according to a predetermined order based on a second result of the boundary condition.

In another aspect, in general, a computer-readable storage medium storing a computer program for sorting data elements can include instructions for causing a computing system to store a received stream of data elements in a buffer, and process the received stream of data elements. The processing of the receiving stream of data elements can include applying a boundary condition to the data elements stored in the buffer after receiving each individual data element of the stream of data elements, and producing one or more data elements from the buffer based on the boundary condition as an output stream of data elements sorted according to a predetermined order.

In another aspect, in general, a computing system for sorting data elements can include a data storage system a received stream of data elements in a buffer; and at least one processor configured to process the received stream of data elements. The processing can include applying a boundary condition to the data elements stored in the buffer after receiving each individual data element of the stream of data elements, and producing one or more data elements from the buffer based on the boundary condition as an output stream of data elements sorted according to a predetermined order.

In another aspect, in general, a computing system for sorting data elements can include a means for storing a received stream of data elements, and a means for processing the received stream of data elements. The processing can include applying a boundary condition to the data elements stored in the buffer after receiving each individual data element of the stream of data elements, and producing one or more data elements from the buffer based on the boundary condition as an output stream of data elements sorted according to a predetermined order.

Aspects can include one or more of the following advantages.

In some implementations involving a mostly sorted received stream of data elements, the elements may be for the most part in sorted order except for a few that are not in proper order with the majority of the elements. Conventional techniques may consume significant computing resources and processing time to sort the elements. In some examples, the techniques described herein can exploit the fact that the majority of data elements arrive appropriately ordered, and thus computational resources and processing time may be conserved. By applying a boundary condition to the data elements stored in a buffer after receiving each individual data element of the stream, an output stream of data elements can be produced that is sorted according to a predetermined order.

Other features and advantages of the invention will become apparent from the following description, and from the claims.

DESCRIPTION

FIG. 2 illustrates a sort buffer through a series of window sorting operations.

Figure 1:
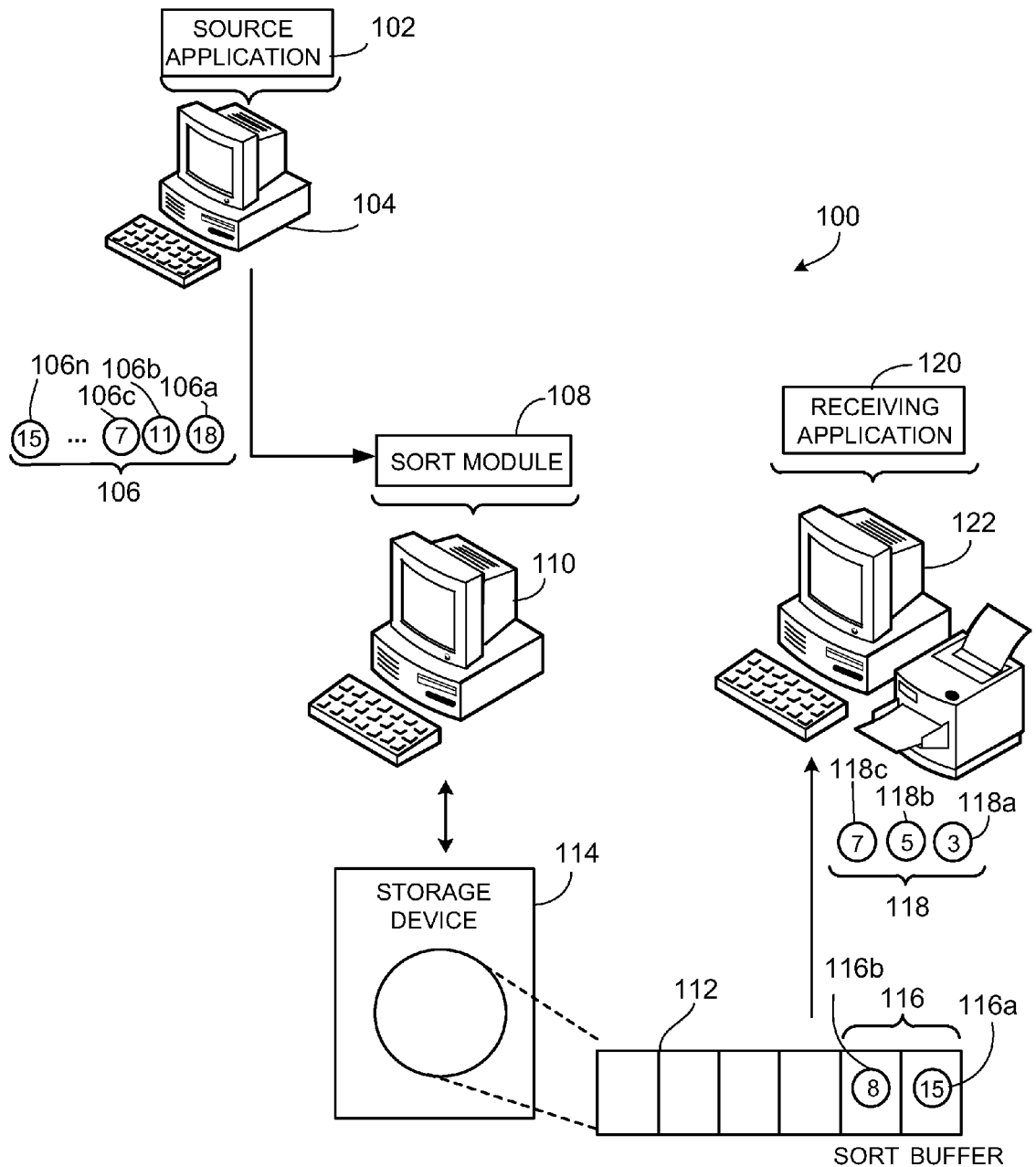
FIG. 1 is a block diagram of a window sorting system.

Referring to FIG. 1, an example sorting system 100 includes a data source application 102 executed on a computer system 104 (e.g., a server such as a Web server servicing one or more client systems) that provides a stream of data elements or items 106a-n (generally 106) to a sort module 108 (being executed in this arrangement by another computer system 108). The elements 106 may be generated by the source application 102 over a certain period of time (e.g., a 24 hour period) and may be sent as they are being produced or retrieved from storage (e.g., a storage device). The elements 106 may represent various types of information, for example, values assigned to one or more attributes of data records (not shown) generated by the source application 102. In some implementations, the elements 106 can represent values computed from one or more data records generated by the source application 102. Other information that may be represented by the elements 106 can include timestamps, e.g., respective times when the data records were created by the source application 102. For example, the source application 102 may create telephone data records to record information about telephone calls made during a specific time period. In such a scenario, each timestamped data element can represent a precise time when a corresponding telephone call ended.

In another implementation, each timestamped data elements can represent a precise time when a corresponding telephone call began. A time when the call began can be calculated by subtracting the length of the call from the time when the call ended. To facilitate such calculations, information about the length of the calls may be stored in the telephone records generated by the source application.

In some arrangements, the individual positioning of the data elements within the stream 106 can take various forms. For example, the order of the data elements may be completely random or somewhat deterministic (e.g., partially sorted, mostly or almost sorted, etc.). For a scenario in which the elements are mostly sorted, only a relatively small percentage of the elements may be unsorted or out of order. As such, in a stream having a relatively significant number of data elements (e.g., millions), approximately 0.1-10% of the elements may be out of order. By way of example, in a scenario when the source application 102 generates timestamped data elements representing termination times of telephone calls, the elements can arrive substantially asynchronously at the sort module 108 and occasionally arrive out of order. For example, data produced by the source application 102 during a first time period can arrive at the sort module 108 after data produced during another time period (later than the first time period).

In a mostly sorted stream, the elements may be for the most part in sorted order except for a few that are not in proper order with the majority of the elements. To insert such outlier elements into proper locations within the stream, conventional sorting techniques typically process all the data elements of the received stream. As such, these techniques may consume significant computing resources and processing time to sort the elements and may create a computational drain that can grow proportional with the numbers of data elements. However, by exploiting the fact that the majority of data elements arrive appropriately ordered, a sorting technique may be developed to conserve computational resources and processing time.

In an example sorting technique, the sort module 108 sorts an almost sorted incoming stream by temporarily storing the incoming elements in a sort buffer and ejecting elements 118a-c (generally 118) from the buffer at appropriate times. Element ejection may occur according to an ejection priority order (e.g., ascending order, descending order, etc.). Further, the ejection occurs when a condition imposed on the elements (e.g., a maximum allowable difference between any two elements stored in the buffer) is violated. Once ejected, the ejected elements 118 may be used to form a sorted output stream of elements.

In some examples, a sorted output stream may be produced by forwarding incoming elements already in sorted order directly to the output steam, while temporarily storing out of order elements in a sort buffer and releasing them into the output stream at appropriate times.

The sort module 108 can be implemented as, for example, a software application executed on the computer system 110 and may provide instructions for controlling a sort buffer 112 (or multiple sort buffers), which may be stored in a storage device 114 (e.g., hard drive memory, random access memory, etc.). The storage device can be implemented as part of the computer system 110 or a separate stand alone memory device.

In examples, stored elements 116 in the sort buffer 112 are sorted according to a priority order, e.g., an order in which the elements are ejected from the buffer. The priority order can be based upon a predetermined property of the elements (e.g., numerical values of the elements). As such, if the elements are sorted according to ascending order of the numerical values, smaller elements may be ejected first while larger elements may be ejected later. If the elements are sorted according to descending order, larger elements may be ejected first while smaller elements may be ejected later. When elements are received in the sort buffer, they may be sorted according to the priority order. In a scenario involving timestamped data elements, the elements can be sorted according to chronological or reverse chronological order. For example, elements representing termination times of telephone calls can be arranged in reverse chronological order.

The ejected data elements 118 can be the smallest value (or largest value, depending on the preferred output) elements of the stored elements in the sort buffer. With timestamped elements, the ejected elements can be the most recent value (or oldest, depending on the preferred output) elements of the stored elements in the sort buffer. The ejected elements may be provided to one or more modules, applications (e.g., a receiving application 120), etc. being executed on another computing device (e.g., a computer system 122). The receiving application 120 can be any software application for receiving and processing the substantially sorted output stream.

In one arrangement, one end of the sort buffer may by configured to receive newly arriving elements. While propagating through the sort buffer (from this particular end), the received data element (along with other elements) may be processed by the sort module 108 such that the element is positioned between appropriate data elements as it nears the opposing end of the buffer (from which the element is ultimately ejected).

Since the incoming elements are mostly or almost ordered, insertion into the sort buffer 112 often occurs at the end of the buffer. Such insertion operations can be considered to take a period of O(1) time. As long as the elements are received in sorted order, the elements are progressively added to successive memory locations of the sort buffer. However, if an element arrives out of order, the insertion time needed may be longer to accommodate time needed to find an appropriate memory location to insert the element. For example, if a location for receiving an out of order element is at a distance "k" from an end of the sort buffer, identifying the proper location may need a period of O(log(k)) time. Once identified, the time needed to insert the element can be considered to be constant. If there are "n" stored data elements already in the sort buffer, the insertion location can be regarded as being no more than "n" locations from the end of the sort buffer. Accordingly, a worst-case insertion time can be O(log(n)) time.

The sort buffer 112 can be implemented by a data structure configured to receive and store data elements in a sorted order (e.g., a priority queue data structure). When a new data element arrives, the sort module 108 can insert the element in an appropriate location, as determined by the prevailing sort order in the sort buffer (implemented as a priority queue). Further, the sort module 108 can identify a data element or elements to be ejected based upon the ejection priority order (e.g., a smallest or largest data element in the buffer). Once identified, the sort module may initiate the ejection of the identified element from the sort buffer.

In some implementations, the sort buffer 112 can be a balanced binary tree data structure (e.g., a heap binary tree data structure). A heap binary tree data structure (often just referred to as a heap) is generally considered as satisfying two conditions. A first condition is that the priorities of children nodes are at least as large as the priority of the parent node. Accordingly, the node at the top (i.e., root node) of the tree can be considered to have a minimum priority. A second condition is that different paths from the root node to a leaf node differ in height by at most one level of nodes.

In one implementation, the sort buffer can be implemented by a skip list data structure. A skip list data structure and its associated algorithms are a variant of a linked linear list and may improve sorting performance in situations calling for frequent insertions of keyed data elements. A skip list data structure includes an ordered, linked linear list of data elements (or nodes), in which some elements have additional pointers that skip intermediate data elements, thereby increasing the speed and efficiency of searches of data elements.

By implementing a sort buffer as a skip list data structure, the time needed to retrieve, for example, a smallest data element from the buffer may be O(1) time to retrieve a smallest data element. Insertion times may be O(1) time to appropriately insert a data element (e.g., element is inserted adjacent to a most recently inserted element). Insertion time may be O(log N) time if the insertion location is not adjacent to the most recently element. Ejection times may be O(k) time to read out "k" elements (e.g., elements with the largest values). Skip list data structures are described in further detail in a paper by William Pugh, entitled "Skip lists: A probabilistic alternative to Balanced trees" Communications of the ACM. June 1990, pp. 668-676, the contents of which are incorporated herein by reference in their entirety.

In some examples, the sort buffer 112 can be implemented by a "treap" data structure. A treap data structure is a binary search tree in which each node has a randomly assigned priority attribute as well as a key. The nodes are in order with respect to their keys as in a typical binary search tree. That is, with respect to the keys a left subtree of a node contains only nodes with keys less than the node's key, while the right subtree of the node contains only nodes with keys greater or equal than the node's key. In addition, the nodes are in "heap order" with respect to their priority attributes such that each child node has a priority attribute that is at least as large as a parent node's priority attribute. Treap data structures are described in a paper by Aragon, Cecilia R., and Seidel, Raimund, entitled "Randomized Search Trees", Proc. 30th Symp. Foundations of Computer Science (FOCS 1989), the contents of which are incorporated herein by reference in their entirety.

In an implementation, the sort module 108 causes a boundary condition to be applied on the sort buffer 112, which is used to determine whether and when an element from the sort buffer is to be ejected. The boundary condition may define a "window" of values permitted in the sort buffer. For example the window may represent a maximum allowable difference between any two stored data elements in the sort buffer. As such, a "width" of the window represents the range of values permitted in the sort buffer. For example, the window width can be a difference between a smallest and largest element in the sort buffer.

The boundary condition can have at least two results. For example, a first result may imply that the boundary condition is satisfied, and a second, different result may indicate that the boundary condition is violated (i.e., not satisfied). In one scenario, a boundary condition can be regarded as being satisfied as long as no incoming element provided causes the window width to be exceeded. Conversely, the boundary condition may be considered as being violated if the incoming element causes the window width to be exceeded. Upon violation of the boundary condition, one or more elements in the buffer are ejected according to an ejection priority order.

By way of an example, assume a scenario in which the sort buffer has numeric values as stored elements (in ascending order). A window width of a value of 15 for the sort buffer indicates that a difference between a smallest and largest stored element in the buffer does not exceed 15. As such, if a current smallest element in the buffer is 3, and a new incoming element is 19, the difference between the smallest and largest elements is now 16, which exceeds the window width and the boundary condition is deemed violated. Due to the violation, and one or more elements (e.g., the smallest or largest data elements) in the sort buffer are ejected.

In some examples, the sort module 108 keeps track of the smallest and largest elements in the sort buffer 112 as determined by the window width. When an incoming element exceeds the largest element, the boundary condition is deemed violated, and the sort module causes the sort buffer to eject, for example, the smallest data element.

The window width may be provided from a variety of sources, such as being be specified by a user. In one implementation, the window width based upon general knowledge of the particular application for which the sorting is needed. In some contexts, the window width corresponds to a measure of "out-of-orderness", e.g., a measure of how far the elements may be out of order. For example, consider a context involving timestamped data elements. The window width indicates how late a timestamped element can be provided to the sort buffer relative to a timestamped element currently in the buffer (e.g., a smallest or largest timestamped element). For example, if the widow width (in units of time) is four hours, the sort buffer 112 will buffer (i.e. store) all timestamped elements within the four hour window relative to a smallest timestamped element in the sort buffer. Timestamped elements arriving outside the four hour may be discarded, or processed separately.

While a single buffer is used in the illustrated example, multiple buffer architectures may also be utilized. For example, a second buffer (not shown) can be used to buffer timestamped elements arriving during a certain period of time (e.g., 24 hour period). Once the 24 hour period is over, timestamped elements may be rejected, discarded, or processed separately. In an implementation, it is possible for timestamped elements that belong within the 24 hour period to arrive after the 24 hour period. By carefully choosing the cutoff timestamp value, a likelihood that a significant number of legitimate elements will be rejected can be lowered. In some scenarios, a loss of a few legitimate elements may be tolerable in applications where the window sorting technique provides in efficient use of computational resources and lower processing times.

FIG. 2 is a diagrammatic representation of states 202-218 of a sort buffer (e.g., sort buffer 112) during operations of a window sorting process. Information about individual contents of the sort buffer, a window width (referenced with label W), a smallest element (referenced with label S), and current output data elements is provided for each state 202-218. In this example, the data elements are stored in ascending order and the incoming stream is almost sorted in ascending order. At the conclusion of the window sorting process, an output stream is provided that is substantially sorted in ascending order. While FIG. 2 shows the example window sorting process operating on a stream of just eight elements, the process may execute continuously on an incoming stream that includes substantially more elements.

In state 202, a window width is defined to have a value of 15 (i.e., a difference between the smallest and largest values of elements in the buffer does not exceed or equal 15). At initialization, a current smallest element in the sort buffer is of value 0 (S=0). Further, the current output is shown to be "NIL", i.e., there are no output data elements.

In state 204, a first incoming element of value 3 is inserted in the sort buffer. The location of 3 in the buffer is determined based on the current order of elements in the sort buffer (i.e., ascending order). The element of value 3 is inserted adjacent to the 0 as shown. The difference between the smallest and largest values of elements in the sort buffer is now 3, which is less than the window width, 15. Accordingly, the boundary condition is not violated, and no data elements need to be ejected. At this point, there are no output data elements.

In states 206 and 208, elements of values 5 and 7 of the input stream are inserted into the sort buffer at appropriate locations. The difference between the smallest and largest elements in the sort buffer at the end of state 208 is 7, which is still less than the window width, 15. As such, the boundary condition is not violated, and no data elements need to ejected. Accordingly, there are still no output data elements.

In state 210, when an element of value 15 is inserted into the sort buffer, the difference between the smallest and largest elements in the buffer is now 15, which is equal to the window width, 15. The boundary condition is violated. Accordingly, element of value 0, which is the smallest element in the sort buffer 112 is ejected as a first element of the output stream. In addition, the smallest element in the sort buffer, S, is now 3.

In state 212, an element of value 8 is inserted between elements of values 15 and 7 in the sort buffer. The difference between the smallest and largest values of elements in the buffer is 12, which is less than the window width, 15. Accordingly, the boundary condition is not violated, and no data elements are ejected.

In state 214, when an element of value 21 is inserted into the sort buffer, the difference between the smallest and largest values of elements in the buffer is 21=3=18, which exceeds the window width, 15. All data elements having values that are outside the window width are ejected. That is, elements of values 3, 5, and 7 are ejected as shown. The new smallest data element, S, in the sort buffer is now the element of value 8.

In state 216, when an element of value 11 is inserted into the sort buffer, the difference between the smallest and largest values of elements in the buffer is 21−8=13, which is less than the window width 15. Accordingly, the boundary condition is not violated, and no data elements are ejected.

In state 218, when an element of value 7 is inserted into the sort buffer, the smallest element in the sort buffer 112 is of value 7. As such, the difference between the smallest and largest values of elements in the buffer is 21−7=14, which is less than the window width 15. Accordingly, once again the boundary condition is not violated, and no data elements are ejected.

Figure 3:
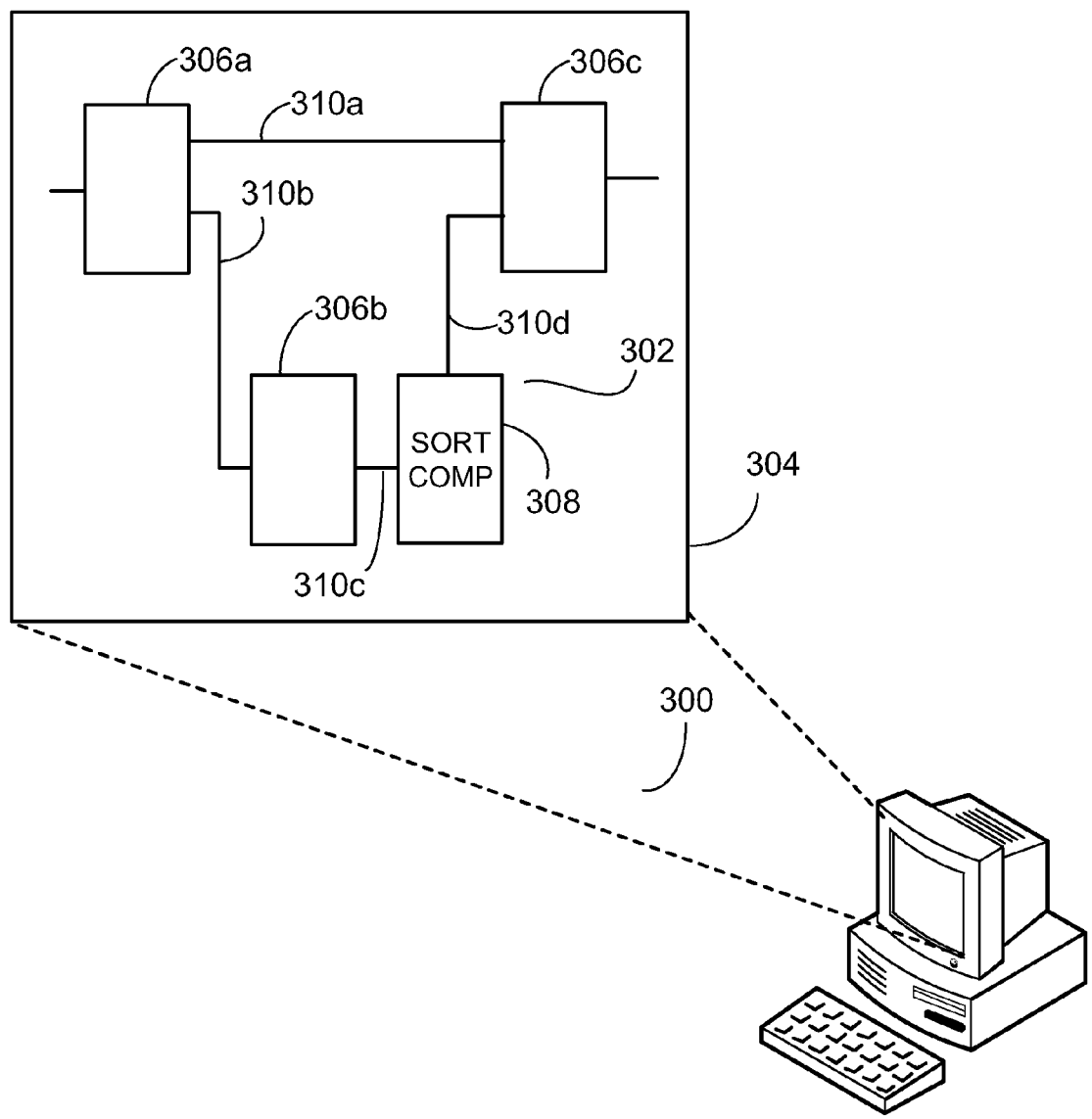
FIG. 3 is a block diagram of a computing system for managing graph-based computations.

An implementation of a window sorting process can be used in computational graphs. Referring now to FIG. 3, interrelationship of parts of a system 300 for managing a computational graph 302 is shown. A graphic development environment (GDE) 304 provides a user interface for specifying an executable computational graph 302 and defining parameters for one or more graph components 306a-c including a window sorting component 308 in the computational graph 302. The GDE 304 may be, for example, described in U.S. Pat. No. 7,164,422, PARAMETERIZED GRAPHS WITH CONDITIONAL COMPONENTS, the contents of which are incorporated herein by reference in their entirety.

A computational graph 302 can be used to express complex computations. A system that implements such graph-based computations is described in U.S. Pat. No. 5,966,072, EXECUTING COMPUTATIONS EXPRESSED AS GRAPHS, the contents of which are incorporated herein by reference in their entirety. In some implementations, a computational graph includes vertices (representing components or datasets) connected by directed links (representing flows of work elements) between the vertices. In some cases, a computational graph 302 is configured to receive a flow of input data records and process the data records to provide results from the components 306 indefinitely until the computation is shut down. In some cases, the computational graph 302 is configured to receive a batch of input data records and process the batch of data records to provide results for that batch, and then shut down or return to an idle state after the batch has been processed.

The components 306a-c and 308 are linked together by directed arcs or lines that represent data flows between the components 306a-c and 308. The components 306a-c and 308 can include one or more data source components (e.g., component 306a), data processing components (e.g., component 306b), and data sink components (e.g., 306d). The data source component 306a may represent a source application implemented on one or more computer systems (such as source application 102 of FIG. 1) that produces data, e.g., in the form of data records. The data processing component 306b processes the data records produced by the data source component 306a. The data sink component 306d uses the results of the data processing component 306b. The results from the data processing component 306b can be in the form of a stream of mostly sorted data elements. As such, a window sort component 308 can be introduced to sort the result stream from the data processing component 306b and providing a substantially sorted data stream to the sink component 306c.

In an example scenario, the data source component 306a may produce two identical sorted data streams 310a and 310b and send one stream (e.g., stream 310b) into component 306b. The component 306b processes the stream 310b to produce an addresses stream 310c with addresses of memory locations where the data records are stored. The memory locations are known to be contiguous and consecutively arranged as follows: $a_0, a_0+1, a_0+2 \ldots a_0+n$ (where $a_0$ is an address of an initial memory location). As such, the individual addresses in the addresses stream are also expected to be consecutively ordered. However, sometimes processing delays in the component 306b may cause one or more addresses to be output late to the addresses stream. Consequently, the individual addresses no longer properly correspond to the data records in the sorted stream 310a. To remedy this situation, the sort component 308 can be used to sort the address back to the original order (which is produced as a new addresses stream 310d).

In a typical application, the positions of individual addresses in the addresses stream are not too far from their original positions. This property can be exploited by the sort component to restore the addresses back to their original positions. The addresses stream is received in a sort buffer having a boundary condition in the form of a dynamically readjusted cutoff address that changes after each incoming address and/or ejection of each output address. Originally, the cutoff address is initialized to an earliest address in the addresses stream. Subsequently, if an incoming address is greater than the cutoff address by one, the cutoff address is changed to the incoming address. As address arrive at the sort component, addresses that collate less than or equal to the cutoff address are output directly in a sorted manner. On the other hand, addresses that collate greater than the cutoff address value are stored in the sort buffer.

Figure 4:
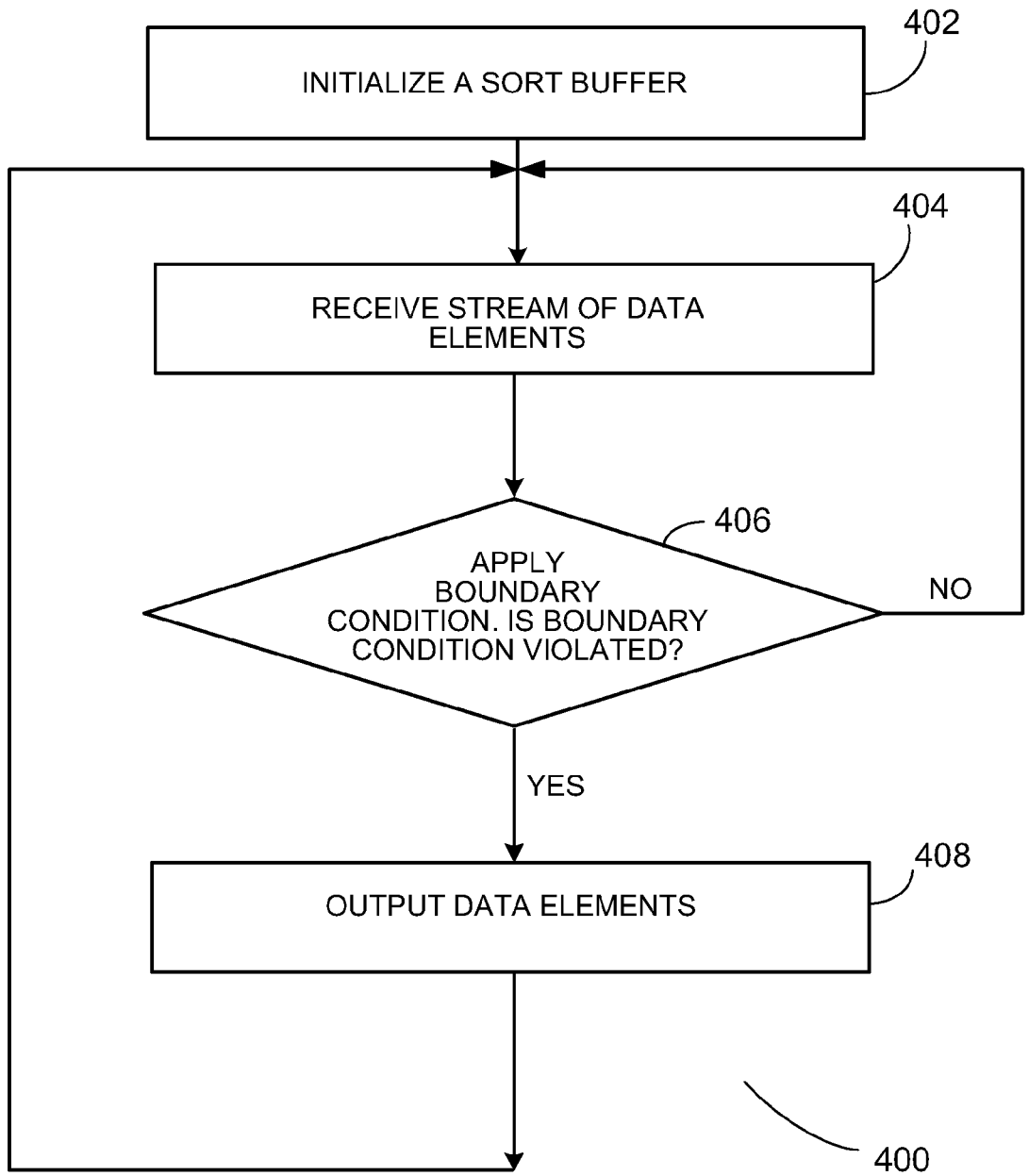
FIG. 4 is a flowchart of a window sorting process.

Referring now to FIG. 4, an example window sorting process 400 for sorting an almost or mostly sorted stream of data elements is shown. In an implementation, the steps outlined below may be carried out by a software application executed on a computer system. For example, the process 400 may be realized by the sorting system 100 (as shown in FIG. 1). A sort buffer for buffering incoming data elements is initialized. (Step 402) The initialization can include specifying a memory area, e.g., a plurality of contiguous memory addresses, for storing incoming elements. As part of initialization, a boundary condition can be specified on the sort buffer. For example, a variable can be defined to hold a value corresponding to a window width for the sort buffer. The window width may represent a maximum allowable difference between any two stored data element values in the sort buffer. In some examples, the boundary condition can be represented as a dynamically adjusted cut-off value.

After the boundary condition on the sort buffer is defined, the sort buffer is ready to receive the incoming stream of data elements. (Step 404) In an implementation, an incoming element is received and inserted into the sort buffer. Initially, when the sort buffer is empty, a first element is selected by default as having a predefined characteristic (e.g., the first element may be selected as having a highest ejection priority). For example, the first element may be deemed to be the smallest element in the sort buffer. When a subsequent larger element is received, it is inserted into an appropriate location based on the removal or ejection priority (i.e., in ascending order adjacent to the first element). In an implementation, every time an element is inserted into the buffer, the highest priority element (or the smallest element) is recalculated.

The boundary condition is applied to determine if the elements violate the boundary condition. (Step 406) For example, a determination is made whether the window width of the sort buffer is exceeded. If the boundary condition is not violated (e.g., the window width of the sort buffer is not exceeded), the next data element in the incoming stream is received for processing.

If the boundary condition is violated (e.g., the window width is exceeded), one or more elements are ejected according to an ejection priority order. (Step 408) For example, the ejected elements include at least the smallest element and one or more other elements that also cause the window width of the sort buffer to be exceeded. Further, a new smallest element that does not cause the window width to be exceeded is identified.

The process 400 is repeated for each incoming element for as long as there are incoming elements.

In an implementation, the sort buffer can reach a maximum capacity, for example, because a physical memory size may be exceeded. In such situations, a spill-over mechanism can be implemented. The spill over mechanism involves transferring one or more data elements from the sort buffer to a secondary memory storage area (not shown). A "key" element or item may be inserted in the sort buffer to reference the data elements in the secondary memory storage area. The spill-over mechanism is described in greater detail in co-pending U.S. patent application Ser. No. 13/031,034, the contents of which are incorporated herein by reference in their entirety.

In some implementations, the boundary condition can be represented by a predefined maximum allowable size of the sort buffer (e.g., maximum number of elements permitted in the buffer). Also in an implementation, the boundary condition can be represented by both a window width limitation as well as the maximum size limitation. In this implementation, the sort module can cause the ejection of elements in response to receiving an element that causes either the window width or the maximum size of the buffer to be exceeded.

In some examples, data elements that remain in the sort buffer at the end of a processing period can be output in a sorted manner at the end of processing. In some examples, the remaining elements can be processed separately and differently from the rest of the data elements. In some implementations, an application may alert a user to an error or malfunction of the application's computation logic when, for example, the sort buffer stores more than a predetermined number of elements or stores any elements at all.

In an example, a user can be alerted to the presence of data elements that caused the boundary condition on a sort buffer to be violated. For instance, in an implementation where a user is presented with a list of data records that are in, for example, reverse chronological order, the user can be alerted to the presence of one or more out-of-order data records. The out-of-order data records are identified based on determining whether data elements corresponding to the records satisfy a boundary condition, e.g., whether the data elements are within a window width specified by a user. For example, the one or more out-of-order data records can be highlighted to draw the user's attention. In some examples, the one or more out-of-order data records can be extracted from the stream of data elements for separate processing.

The techniques described herein can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

The invention claimed is:

1. A computer implemented method, including:
   storing an initial data element in a buffer;
   receiving, by a computer, a plurality of data elements;
   storing, by a computer, each of the received plurality of data elements in the buffer, in which after each received individual data element is stored in the buffer, the computer identifies a smallest or largest data element from the data elements stored in the buffer, calculates a difference between the smallest or largest data element and the received individual data element, comparing the difference with a maximum allowable difference value, and determining whether the difference exceeds the maximum allowable difference value indicating that a boundary condition is not satisfied; and
   when the boundary condition is not satisfied by one or more of the data elements that are stored in the buffer, ejecting, by the computer, one or more data elements from the buffer, wherein the ejected data elements form an output stream of data elements sorted according to a predetermined order.

2. The method of claim 1, in which ejecting the one or more data elements from the buffer includes one or more of ejecting at least the smallest data element from the buffer if the difference between the smallest data element and the received individual data element exceeds the maximum allowable value and ejecting at least the largest data element from the buffer if the difference between the largest data element and the received individual data element exceeds the maximum allowable value.

3. The method of claim 1, in which each received data element represents a data record production time.

4. The method of claim 3, in which the output stream of data elements is sorted according to reverse chronological order.

5. The method of claim 1, in which the data elements of the received plurality of data elements are partially sorted.

6. The method of claim 1, in which the data elements of the received plurality of data elements arrive substantially asynchronously at the buffer.

7. The method of claim 1, in which storing a received plurality of data elements in a buffer includes:
   inserting each individual element of the received plurality of data elements in the buffer at a location determined by the sort order of the buffer.

8. The method of claim 1, in which ejecting one or more data elements from the buffer when the boundary condition is not satisfied by one or more of the data elements that are stored in the buffer includes:
   ejecting the one or more data elements from the buffer if the one or more data elements exceed a threshold value.

9. The method of claim 1, in which applying a boundary condition to the data elements stored in the buffer includes:
   determining whether a maximum size of the buffer is exceeded.

10. The method of claim 9, in which ejecting one or more data elements from the buffer when the boundary condition is not satisfied by one or more of the data elements that are stored in the buffer includes:
    ejecting the one or more data elements from the buffer if the maximum size of the buffer is exceeded.

11. The method of claim 1, in which applying a boundary condition to the data elements stored in the buffer includes:
    determining whether a newly received data element exceeds a cutoff value.

12. The method of claim 11, further including:
    buffering the newly received data element if the element does not exceed the cutoff value.

13. The method of claim 11, in which ejecting one or more data elements from the buffer when the boundary condition is not satisfied by one or more of the data elements that are stored in the buffer includes:
    ejecting the newly received data element as the one or more data elements produced from the buffer if the newly received data element does not exceed the cutoff value.

14. The method of claim 1, in which one or more of the individual data elements in the received plurality of data elements are derived from data records that are input to a component in a graph-based computation system.

15. A computer implemented method, including:
    storing an initial data element in a buffer;
    receiving, by a computer, a plurality of data elements;
    after receiving each individual data element of the plurality of data elements, the computer identifies a smallest or largest data element from the data elements stored in the buffer, calculates a difference between the smallest or largest data element and the received individual data element, compares the difference with a maximum allowable difference value, and determines whether the difference exceeds the maximum allowable difference value indicating that a boundary condition is not satisfied;
    storing, by a computer, one or more data elements of the plurality of data elements when the difference does not exceed the maximum allowable difference value indicating that the boundary condition is satisfied; and ejecting, by a computer, one or more data elements when the boundary condition is not satisfied by one or more of the data elements that are stored in the buffer, wherein the ejected data elements form an output stream of data elements sorted according to a predetermined order.

16. A non-transitory computer-readable storage device storing a computer program for sorting data elements, the computer program including instructions for causing a computing system to:
store an initial data element in a buffer;
receive a plurality of data elements; and
process the received plurality of data elements, the processing including:
storing each of the received data elements in a buffer, in which after each received individual data element is stored in the buffer, the processing includes identifying a smallest or largest data element from the data elements stored in the buffer, calculating a difference between the smallest or largest data element and the received individual data element, comparing the difference with a maximum allowable difference value, and determining whether the difference exceeds the maximum allowable difference value indicating that a boundary condition is not satisfied, and
when the boundary condition is not satisfied by one or more of the data elements that are stored in the buffer, ejecting one or more data elements from the buffer, wherein the ejected data elements form an output stream of data elements sorted according to a predetermined order.

17. A computing system for sorting data elements, the computing system including:
an input device for receiving a plurality of data elements;
a data storage system for storing the received plurality of data elements in a buffer; and
at least one processor coupled to the data storage system and configured to process the received plurality of data elements, the processing including:
storing each of the received plurality of data elements in a buffer, in which after each received individual data element is stored in the buffer, the processing includes identifying a smallest or largest data element from the data elements stored in the buffer, calculating a difference between the smallest or largest data element and the received individual data element, comparing the difference with a maximum allowable difference value, and determining whether the difference exceeds the maximum allowable difference value indicating that a boundary condition is not satisfied; and
when the boundary condition is not satisfied by one or more of the data elements that are stored in the buffer, ejecting one or more data elements from the buffer, wherein the ejected data elements form an output stream of data elements sorted according to a predetermined order.

18. A computing system for sorting data elements, the computing system including:
means for storing an initial data element in a buffer;
means for receiving a plurality of data elements;
means for processing the received plurality of data elements, the processing including:
storing each of the received data elements in a buffer, in which after each received individual data element is stored in the buffer, the processing includes identifying a smallest or largest data element from the data elements stored in the buffer, calculating a difference between the smallest or largest data element and the received individual data element, comparing the difference with a maximum allowable difference value, and determining whether the difference exceeds the maximum allowable difference value indicating that a boundary condition is not satisfied, and
when the boundary condition is not satisfied by one or more of the data elements that are stored in the buffer, ejecting one or more data elements from the buffer, wherein the ejected data elements form an output stream of data elements sorted according to a predetermined order.

19. The non-transitory computer-readable storage device of claim 16, in which ejecting the one or more data elements from the buffer includes one or more of ejecting at least a smallest data element from the buffer and ejecting at least a largest data element from the buffer.

20. The non-transitory computer-readable storage device of claim 16, in which each received data element represents a data record production time, and in which the output stream of data elements is sorted according to reverse chronological order.

21. The non-transitory computer-readable storage device of claim 16, in which the data elements of the received plurality of data elements are partially sorted.

22. The non-transitory computer-readable storage device of claim 16, in which the data elements of the received plurality of data elements arrive substantially asynchronously at the buffer.

23. The non-transitory computer-readable storage device of claim 16, in which storing the received plurality of data elements in a buffer includes:
inserting each individual element of the received plurality of data elements in the buffer at a location determined by the sort order of the buffer.

24. The non-transitory computer-readable storage device of claim 16, in which ejecting one or more data elements from the buffer when the boundary condition is not satisfied by one or more of the data elements that are stored in the buffer includes:
ejecting the one or more data elements from the buffer if the one or more data elements exceed a threshold value.

25. The non-transitory computer-readable storage device of claim 16, in which the processing includes:
determining whether a maximum size of the buffer is exceeded.

26. The non-transitory computer-readable storage device of claim 25, in which ejecting one or more data elements from the buffer when the boundary condition is not satisfied by one or more of the data elements that are stored in the buffer includes:
ejecting the one or more data elements from the buffer if the maximum size of the buffer is exceeded.

27. The non-transitory computer-readable storage device of claim 16, in which the processing includes:
determining whether a newly received data element exceeds a cutoff value.

28. The non-transitory computer-readable storage device of claim 27, further including instructions for causing the computing system to buffer the newly received data element if the element does not exceed the cutoff value.

29. The non-transitory computer-readable storage device of claim 27, in which ejecting one or more data elements from the buffer when the boundary condition is not satisfied by one or more of the data elements that are stored in the buffer includes:

ejecting the newly received data element as the one or more data elements produced from the buffer if the newly received data element exceeds the cutoff value.

30. The computing system of claim 17, in which ejecting the one or more data elements from the buffer includes one or more of ejecting at least a smallest data element from the buffer and ejecting at least a largest data element from the buffer.

31. The computing system of claim 17, in which each received data element represents a data record production time, and in which the output stream of data elements is sorted according to reverse chronological order.

32. The computing system of claim 17, in which the data elements of the received plurality of data elements are partially sorted.

33. The computing system of claim 17, in which the data elements of the received plurality of data elements arrive substantially asynchronously at the buffer.

34. The computing system of claim 17, in which storing a received plurality of data elements in a buffer includes:
inserting each individual element of the received plurality of data elements in the buffer at a location determined by the sort order of the buffer.

35. The computing system of claim 17, in which ejecting one or more data elements from the buffer when the boundary condition is not satisfied by one or more of the data elements that are stored in the buffer includes:
ejecting the one or more data elements from the buffer if the one or more data elements exceed a threshold value.

36. The computing system of claim 17, in which applying a boundary condition to the data elements stored in the buffer includes:
determining whether a maximum size of the buffer is exceeded.

37. The computing system of claim 36, in which ejecting one or more data elements from the buffer when the boundary condition is not satisfied by one or more of the data elements that are stored in the buffer includes:
ejecting the one or more data elements from the buffer if the maximum size of the buffer is exceeded.

38. The computing system of claim 17, in which the buffer the processing includes:
determining whether a newly received data element exceeds a cutoff value.

39. The computing system of claim 38, wherein the processing further includes buffering the newly received data element if the element does not exceed the cutoff value.

40. The computing system of claim 38, in which ejecting one or more data elements from the buffer when the boundary condition is not satisfied by one or more of the data elements that are stored in the buffer includes:
ejecting the newly received data element as the one or more data elements produced from the buffer if the newly received data element does not exceed the cutoff value.

41. The method of claim 1, wherein the boundary condition defines a window width representing a maximum allowable difference between any two data elements stored in the buffer.

42. The method of claim 41, wherein the boundary condition is not satisfied when a difference between a value of a smallest data element and a value of a largest data element stored in the buffer is greater than the window width.

43. The method of claim 41, wherein the window width is specified by a user.

44. The method of claim 1, wherein the boundary condition is not satisfied by a particular data element that is stored in the buffer when a difference between a timestamp of the particular data element and an earliest timestamp of a data element stored in the buffer exceeds the window width.

45. The method of claim 15, in which ejecting the one or more data elements from the buffer includes one or more of ejecting at least the smallest data element from the buffer if the difference between the smallest data element and the received individual data element exceeds the maximum allowable value and ejecting at least the largest data element from the buffer if the difference between the largest data element and the received individual data element exceeds the maximum allowable value.

46. The method of claim 15, in which each received data element represents a data record production time.

47. The method of claim 46, in which the output stream of data elements is sorted according to reverse chronological order.

48. The method of claim 15, in which the data elements of the received plurality of data elements are partially sorted.

49. The method of claim 15, in which the data elements of the received plurality of data elements arrive substantially asynchronously at the buffer.

50. The method of claim 15, in which storing a received plurality of data elements in a buffer includes:
inserting each individual element of the received plurality of data elements in the buffer at a location determined by the sort order of the buffer.

51. The method of claim 15, in which ejecting one or more data elements from the buffer when the boundary condition is not satisfied by one or more of the data elements that are stored in the buffer includes:
ejecting the one or more data elements from the buffer if the one or more data elements exceed a threshold value.

52. The method of claim 15, in which applying a boundary condition to the data elements stored in the buffer includes:
determining whether a maximum size of the buffer is exceeded.

53. The method of claim 52, in which ejecting one or more data elements from the buffer when the boundary condition is not satisfied by one or more of the data elements that are stored in the buffer includes:
ejecting the one or more data elements from the buffer if the maximum size of the buffer is exceeded.

54. The method of claim 15, in which applying a boundary condition to the data elements stored in the buffer includes:
determining whether a newly received data element exceeds a cutoff value.

55. The method of claim 54, further including:
buffering the newly received data element if the element does not exceed the cutoff value.

56. The method of claim 54, in which ejecting one or more data elements from the buffer when the boundary condition is not satisfied by one or more of the data elements that are stored in the buffer includes:
ejecting the newly received data element as the one or more data elements produced from the buffer if the newly received data element does not exceed the cutoff value.

57. The method of claim 15, in which one or more of the individual data elements in the received plurality of data elements are derived from data records that are input to a component in a graph-based computation system.

58. The method of claim 15 in which the boundary condition is not satisfied by a particular data element that is stored in the buffer when a difference between a timestamp of the particular data element and an earliest timestamp of another data element stored in the buffer exceeds a maximum allowable timestamp difference.

59. The method of claim 15 in which the maximum allowable difference is specified by a user.

60. The non-transitory computer-readable storage device of claim 16 in which one or more of the individual data elements in the received plurality of data elements are derived from data records that are input to a component in a graph-based computation system.

61. The non-transitory computer-readable storage device of claim 16 in which the boundary condition is not satisfied by a particular data element that is stored in the buffer when a difference between a timestamp of the particular data element and an earliest timestamp of another data element stored in the buffer exceeds a maximum allowable timestamp difference.

62. The computing system of claim 17 in which one or more of the individual data elements in the received plurality of data elements are derived from data records that are input to a component in a graph-based computation system.

63. The computing system of claim 17 in which the boundary condition is not satisfied by a particular data element that is stored in the buffer when a difference between a timestamp of the particular data element and an earliest timestamp of another data element stored in the buffer exceeds a maximum allowable timestamp difference.

64. A non-transitory computer-readable storage device storing a computer program for sorting data elements, the computer program including instructions for causing a computing system to:
   store an initial data element in a buffer;
   receive a plurality of data elements;
   after receiving each individual data element of the plurality of data elements, identify a smallest or largest data element from the data elements stored in the buffer, calculate a difference between the smallest or largest data element and the received individual data element, compare the difference with a maximum allowable difference value, and determine whether the difference exceeds the maximum allowable difference value indicating that a boundary condition is not satisfied;
   store one or more data elements of the plurality of data elements when the difference does not exceed the maximum allowable difference value indicating that the boundary condition is satisfied; and
   eject one or more data elements when the boundary condition is not satisfied by one or more of the data elements that are stored in the buffer, wherein the ejected data elements form an output stream of data elements sorted according to a predetermined order.

65. The non-transitory computer-readable storage device of claim 64, in which ejecting the one or more data elements from the buffer includes one or more of ejecting at least the smallest data element from the buffer if the difference between the smallest data element and the received individual data element exceeds the maximum allowable value and ejecting at least the largest data element from the buffer if the difference between the largest data element and the received individual data element exceeds the maximum allowable value.

66. The non-transitory computer-readable storage device of claim 64, in which each received data element represents a data record production time.

67. The non-transitory computer-readable storage device of claim 66, in which the output stream of data elements is sorted according to reverse chronological order.

68. The non-transitory computer-readable storage device of claim 64, in which the data elements of the received plurality of data elements are partially sorted.

69. The non-transitory computer-readable storage device of claim 64, in which the data elements of the received plurality of data elements arrive substantially asynchronously at the buffer.

70. The non-transitory computer-readable storage device of claim 64, in which storing the received plurality of data elements in a buffer includes:
   inserting each individual element of the received plurality of data elements in the buffer at a location determined by the sort order of the buffer.

71. The non-transitory computer-readable storage device of claim 64, in which ejecting one or more data elements from the buffer when the boundary condition is not satisfied by one or more of the data elements that are stored in the buffer includes:
   ejecting the one or more data elements from the buffer if the one or more data elements exceed a threshold value.

72. The non-transitory computer-readable storage device of claim 64, in which the processing includes:
   determining whether a maximum size of the buffer is exceeded.

73. The non-transitory computer-readable storage device of claim 72, in which ejecting one or more data elements from the buffer when the boundary condition is not satisfied by one or more of the data elements that are stored in the buffer includes:
   ejecting the one or more data elements from the buffer if the maximum size of the buffer is exceeded.

74. The non-transitory computer-readable storage device of claim 64, in which the processing includes:
   determining whether a newly received data element exceeds a cutoff value.

75. The non-transitory computer-readable storage device of claim 74, further including instructions for causing the computing system to buffer the newly received data element if the element does not exceed the cutoff value.

76. The non-transitory computer-readable storage device of claim 74, in which ejecting one or more data elements from the buffer when the boundary condition is not satisfied by one or more of the data elements that are stored in the buffer includes:
   ejecting the newly received data element as the one or more data elements produced from the buffer if the newly received data element exceeds the cutoff value.

77. The non-transitory computer-readable storage device of claim 64, in which one or more of the individual data elements in the received plurality of data elements are derived from data records that are input to a component in a graph-based computation system.

78. A computing system for sorting data elements, the computing system including:
   an input device for receiving a plurality of data elements;
   a data storage system for storing data elements in a buffer that has an initial data element; and
   at least one processor coupled to the data storage system and configured to process the received plurality of data elements, the processing including:
      after receiving each individual data element of the plurality of data elements, identifying a smallest or largest data element from the data elements stored in the buffer, calculating a difference between the smallest or largest data element and the received individual data element, comparing the difference with a maximum allowable difference value, and determining whether the difference exceeds the maximum allowable difference value indicating that a boundary condition is not satisfied;

storing one or more data elements of the plurality of data elements when the difference does not exceed the maximum allowable difference value indicating that the boundary condition is satisfied; and ejecting one or more data elements when the boundary condition is not satisfied by one or more of the data elements that are stored in the buffer, wherein the ejected data elements form an output stream of data elements sorted according to a predetermined order.

79. The computing system of claim 78 in which ejecting the one or more data elements from the buffer includes one or more of ejecting at least the smallest data element from the buffer if the difference between the smallest data element and the received individual data element exceeds the maximum allowable value and ejecting at least the largest data element from the buffer if the difference between the largest data element and the received individual data element exceeds the maximum allowable value.

80. The computing system of claim 78 in which each received data element represents a data record production time, and in which the output stream of data elements is sorted according to reverse chronological order.

81. The computing system of claim 78 in which the data elements of the received plurality of data elements are partially sorted.

82. The computing system of claim 78 in which storing a received plurality of data elements in a buffer includes:

inserting each individual element of the received plurality of data elements in the buffer at a location determined by the sort order of the buffer.

83. The computing system of claim 78 in which one or more of the individual data elements in the received plurality of data elements are derived from data records that are input to a component in a graph-based computation system.

84. The computing system of claim 78 in which the boundary condition is not satisfied by a particular data element that is stored in the buffer when a difference between a timestamp of the particular data element and an earliest timestamp of another data element stored in the buffer exceeds a maximum allowable timestamp difference.

* * * * *

UNITED STATES PATENT AND TRADEMARK OFFICE
CERTIFICATE OF CORRECTION

PATENT NO. : 9,003,084 B2  
APPLICATION NO. : 13/031056  
DATED : April 7, 2015  
INVENTOR(S) : Craig W. Stanfill and Carl Richard Feynman Page 1 of 1

It is certified that error appears in the above-identified patent and that said Letters Patent is hereby corrected as shown below:

In the Claims

Col. 11, Line 48, claim 1, delete "comparing" and insert -- compares --.

Col. 11, Lines 50, claim 1, delete "determining" and insert -- determines --.

Col. 13, Line 59, claim 18, after "elements;" insert -- and --.

Col. 15, Line 42, claim 38, after "which" delete "the buffer".

Signed and Sealed this  
First Day of December, 2015

Michelle K. Lee  
*Director of the United States Patent and Trademark Office*